United States Patent [19]

Smith et al.

[11] Patent Number: 5,188,216
[45] Date of Patent: Feb. 23, 1993

[54] MAGNETIC GRID

[76] Inventors: Stephen R. Smith, 3531 Castlehill Way, Tucker, Ga. 30084; Geri G. Walker, 58 Hampton Way, Carrollton, Ga. 30117

[21] Appl. No.: 549,734
[22] Filed: Jul. 9, 1990
[51] Int. Cl.⁵ .............................................. B65G 15/46
[52] U.S. Cl. ............................. 198/803.6; 198/690.1; 198/803.01
[58] Field of Search .................. 198/803.6, 690.1, 802, 198/803.2, 803.01

[56] References Cited

U.S. PATENT DOCUMENTS

| | | | |
|---|---|---|---|
| 4,235,187 | 11/1980 | Mirza | 198/690.1 X |
| 4,586,601 | 5/1986 | Hodlewsky | 198/690.1 |
| 4,836,360 | 6/1989 | Kasik | 198/690.1 X |

Primary Examiner—Joseph E. Valenza
Assistant Examiner—Tuan N. Nguyen
Attorney, Agent, or Firm—B. J. Powell

[57] ABSTRACT

A conveyor system for use in a continuous proofing and baking apparatus to convey ferromagnetic dough receptacles comprising an elongate track with a conveyor chain mounted in the track and a plurality of product supporting grid assemblies on the chain where each grid assembly includes a support frame mounted on the chain and a plurality of magnet units mounted on the support frame for selected movement between two positions to magnetically mount different types of the ferromagnetic dough receptacles.

6 Claims, 13 Drawing Sheets

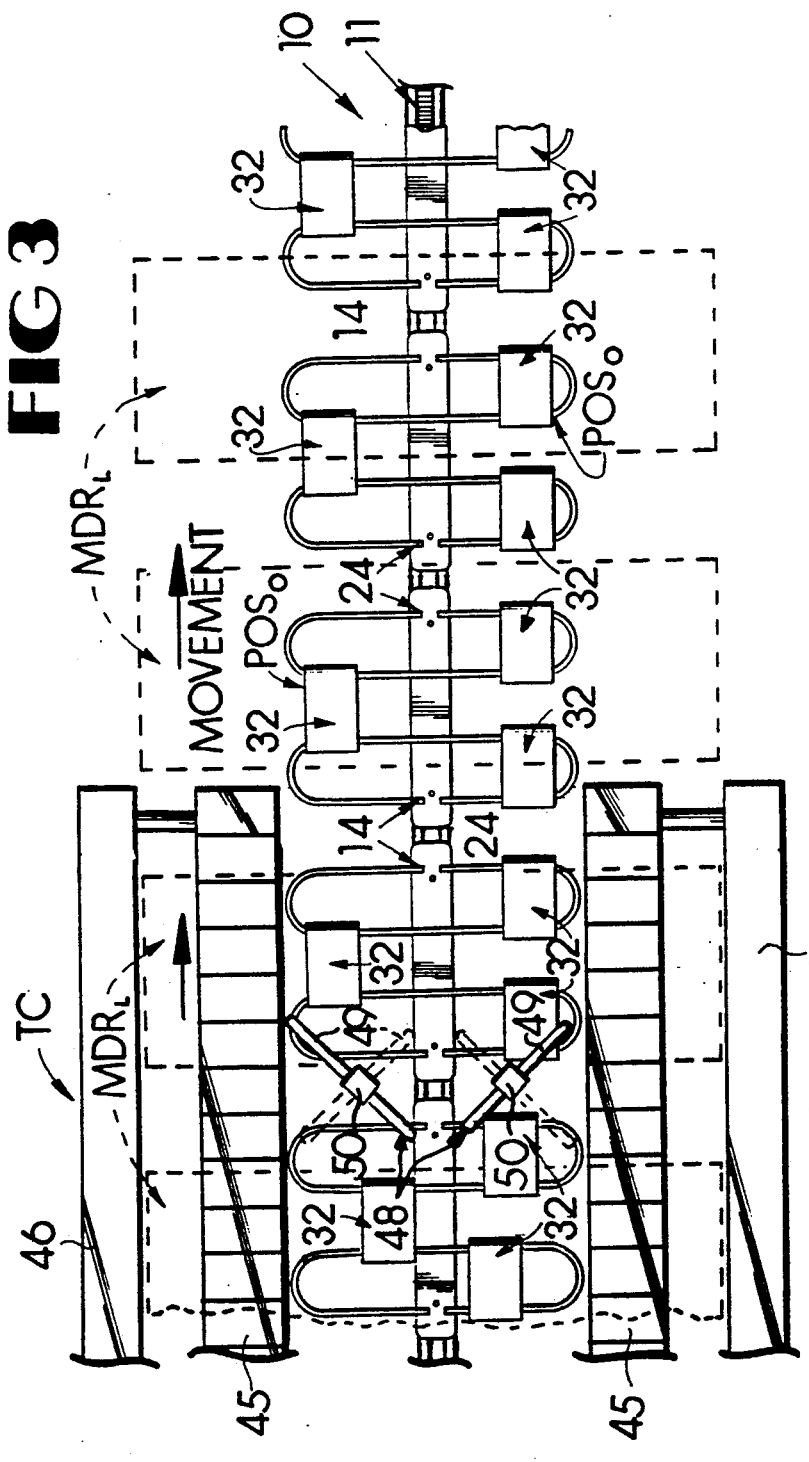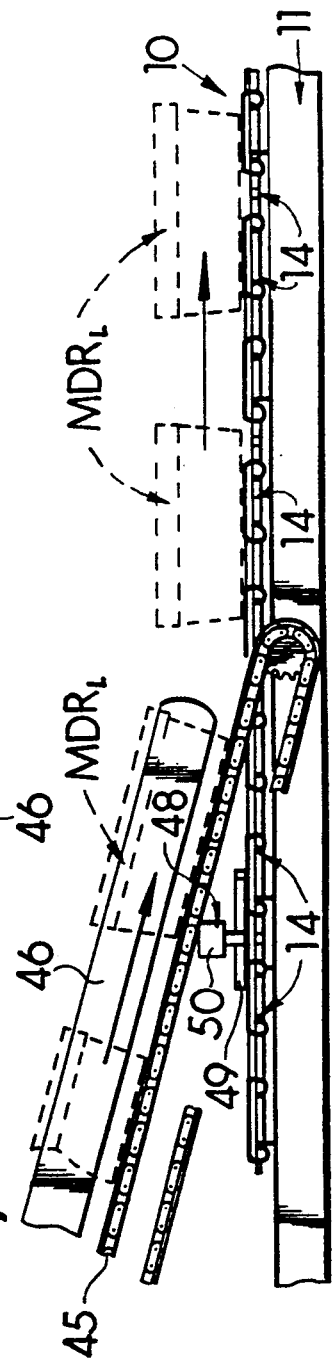

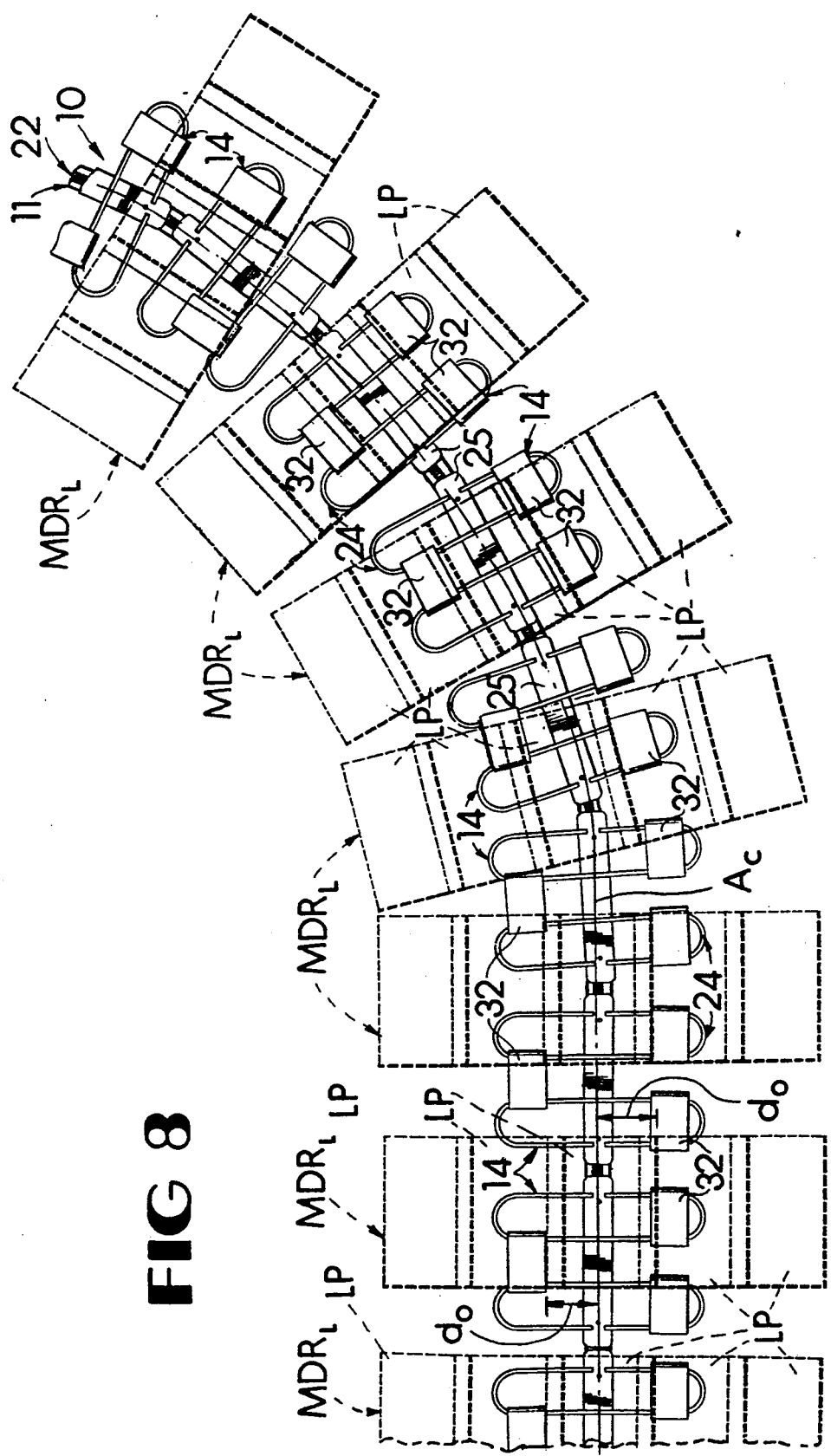

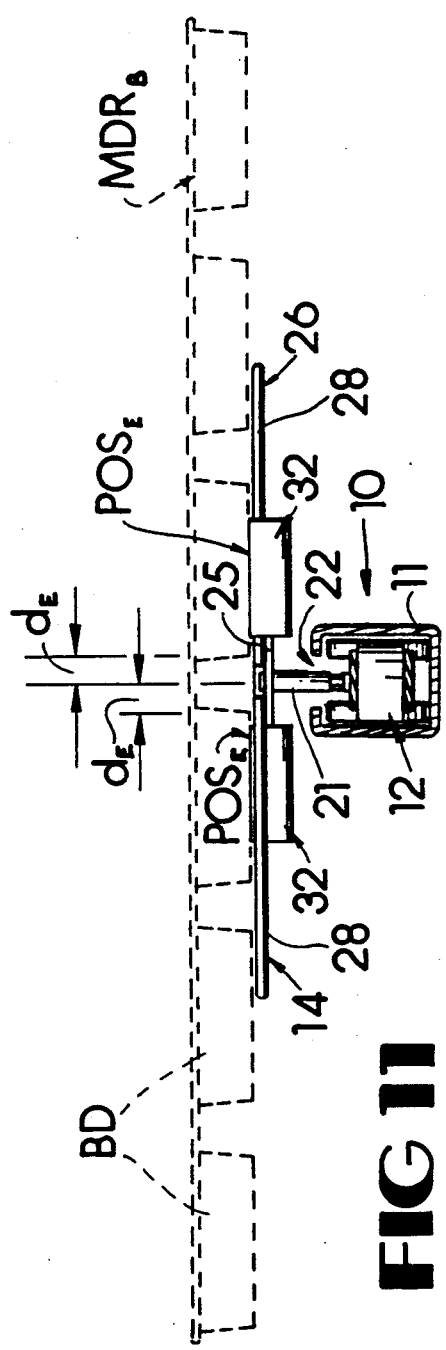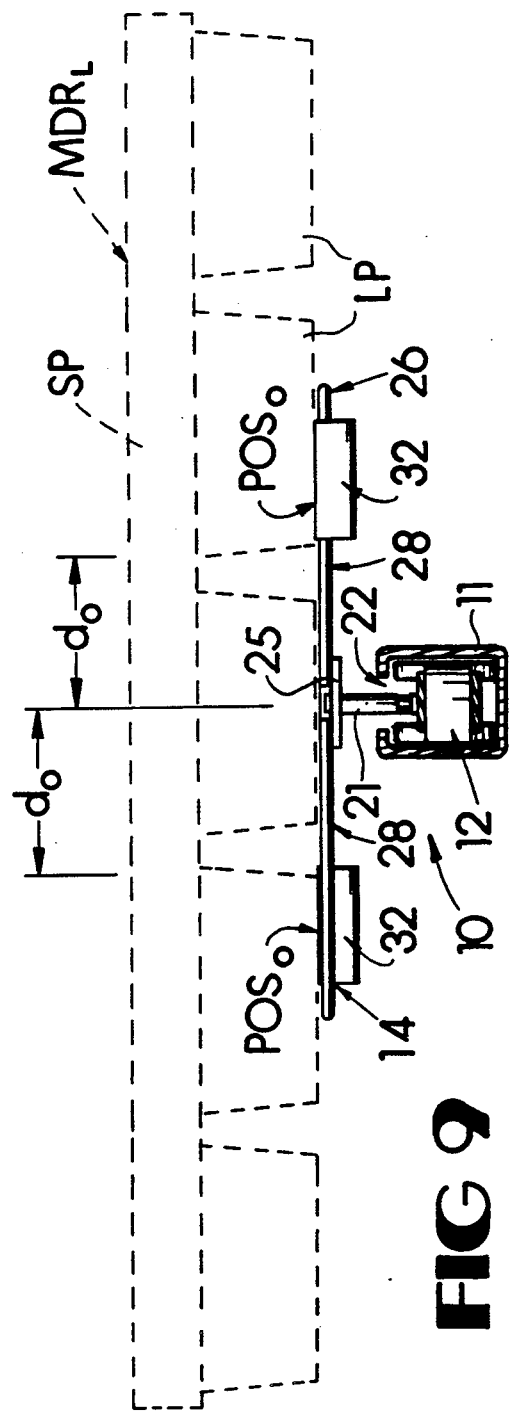

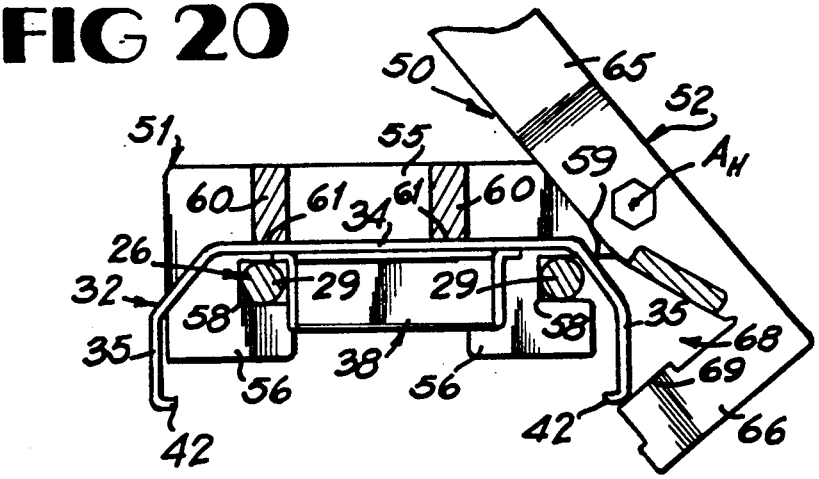
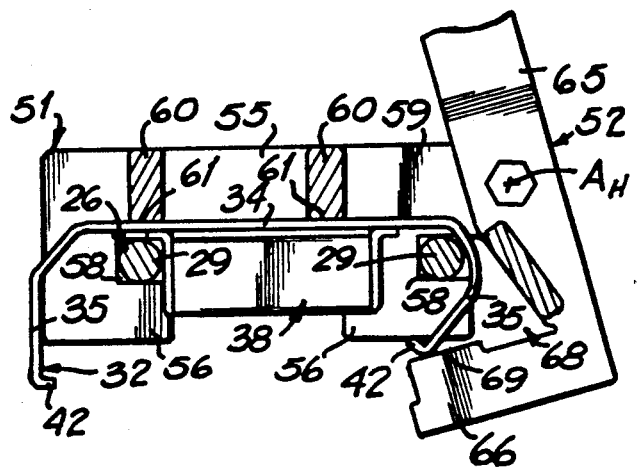
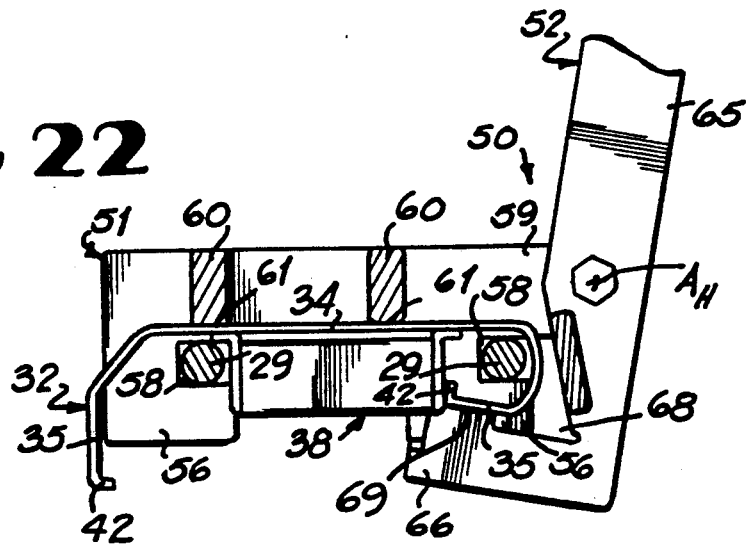

MAGNETIC GRID

BACKGROUND OF THE INVENTION

This invention relates generally to conveyor systems and more particular to a conveyor system for the baking industry which uses magnetic forces to maintain the conveyed articles on the conveyor system.

In the commercial baking industry, it is necessary to convey the metal dough receptacles as the dough products are proofed and baked. Typically, these metal receptacles are moved along an endless conveyor which extends in helical flights through the particular piece of equipment so that the required residence time of the dough product in the piece of equipment is achieved. The general construction of such endless conveyors is well known and illustrated in the following patents:

| Patent No. | Patent Date | Inventor |
| --- | --- | --- |
| 3,094,206 | 06/18/63 | H. H. Stewart, et al |
| 3,285,394 | 11/15/66 | W. E. Lanham, et al |
| 3,440,973 | 04/29/69 | W. E. Lanham, et al |
| 3,478,705 | 11/18/69 | W. E. Lanham, et al |
| 4,726,766 | 02/23/88 | Stewart, et al |

Because different sized metal receptacles are used in a typical baking operation, the endless conveyor mounts a plurality of grids thereon that support the pans. Because the pans frequently are moved through arcuate turning movements within the piece of baking equipment, it is also necessary to provide some means for maintaining the metal receptacles on the grids. Several suggestions have been made to maintain the receptacles on the grids. One such technique utilizes a single rib on each grid that extends into depressions in the bottom of the metal receptacle to laterally maintain it in place while another arrangement uses a pair of spaced apart members pivotally mounted on a axis generally parallel to the endless conveyor and spaced laterally thereof so that the unit can accommodate different metal retainer configurations without adjustment. These types of arrangements are illustrated in the following patents:

| Patent No. | Patent Date | Inventor |
| --- | --- | --- |
| 4,729,470 | 03/08/88 | Bacigalupe, et al |
| 4,760,911 | 08/02/88 | Bacigalupe, et al |

Another arrangement uses a plurality of magnets which are mounted on the grid and magnetically engage the bottoms of the metal receptacles to maintain the receptacle on the grids. This type mechanism is illustrated in U.S. Pat. No. 4,836,360, issued Jun. 6, 1989 to John P. Kasik. One of the problems associated with the magnetic grid arrangement is that the magnitude of the magnetic forces attracting the metal receptacle to the grids is sensitive to the area of contact between the metal receptacle and the magnet. Thus, in order to be economically feasible, it has been necessary to change the numbers and locations of the magnets on the grid each time it was necessary to run metal receptacles of different bottom configurations.

SUMMARY OF THE INVENTION

These and other problems and disadvantages associated with the prior art are overcome by the invention disclosed herein by providing a magnetic system for the grids on an endless conveyor used in the baking industry which can be adjusted to handle metal dough receptacles of different bottom configurations without modifying the magnet and grid configuration. Thus, this invention is an improvement over that disclosed in the above identified magnetic grid system illustrated in U.S. Pat. No. 4,836,360.

The apparatus of the invention includes a plurality of grids mounted on an endless conveyor that moves through apparatus in the baking industry so that metal receptacles for dough products can be supported on the grid and located using magnetic forces. Each grid mounts at least one magnet thereon adapted to lie in juxtaposition with the bottom of a metal dough receptacle. The position of the magnet laterally of the centerline of the grid assembly can be adjusted to accommodate metal dough receptacles of different bottom configurations without having to physically change the magnets on the grid assembly. The apparatus of the invention also includes means for selectively locating the magnets on the grid assembly so that the location of the magnet unit relative to the bottom of the receptacle being loaded onto the grid assembly can be prelocated. This insures maximum magnetic attraction between the metal dough receptacle and the grid assembly even though the bottom configuration of the receptacles changes to maintain the metal dough receptacle on the metal grid assemblies as the endless conveyor moves the metal dough receptacles through the baking equipment.

These and other features and advantages of the invention will become more apparent upon consideration of the following detail description and accompanying drawings wherein like characters of reference designate corresponding parts throughout several views and in which:

BRIEF DESCRIPTION OF THE DRAWINGS

FIG. 3 is a schematic top view of the grid conveyor and transfer conveyor illustrating the positioning of the magnet units;

FIG. 3A is schematic side view of FIG. 3;

FIG. 8 is a schematic top view of the conveyor illustrating its use to support loaf pan metal receptacles with an odd number of pans;

FIG. 9 is a view taken along line 9—9 in FIG. 8;

FIG. 11 is a view taken along line 11—11 in FIG. 10;

FIGS. 20–22 illustrate the magnet unit of the invention being installed.

These figures in the following detailed description disclose specific embodiments of the invention, however, the inventive concept is not limited thereto since it may be embodied in other forms.

DETAILED DESCRIPTION OF ILLUSTRATIVE EMBODIMENTS

Figure 2:
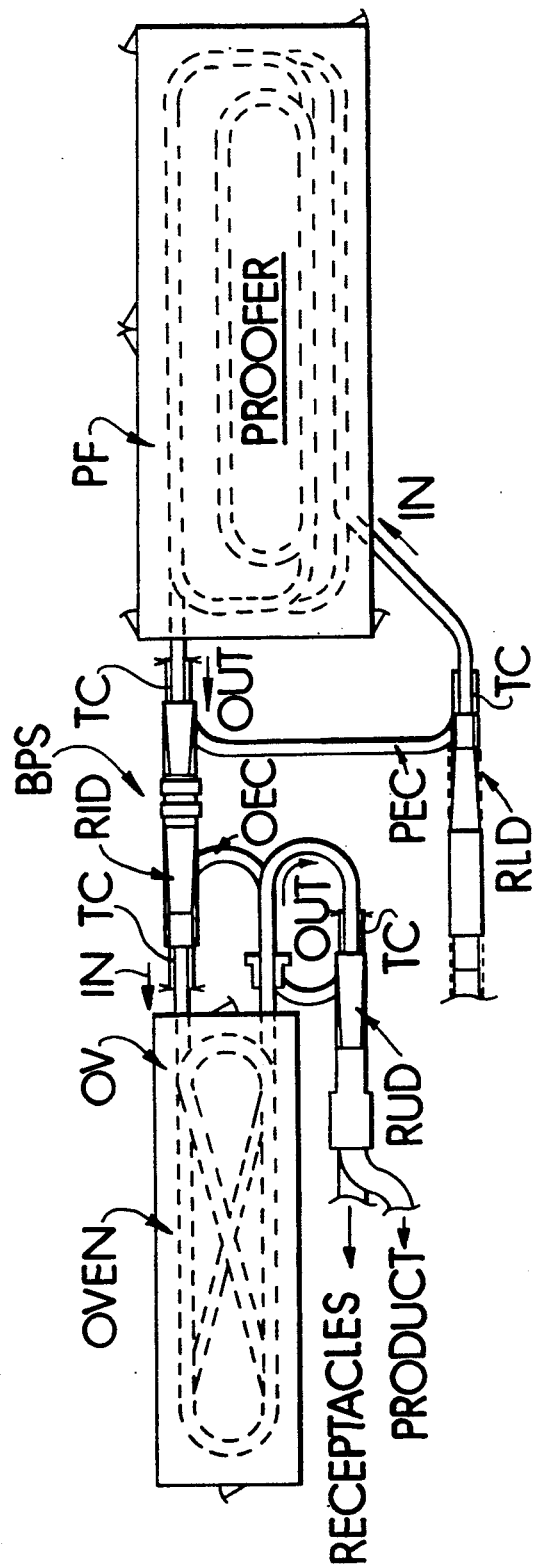
FIG. 2 is a schematic diagram illustrating a typical layout of an application of a conveyor incorporating the invention in the baking industry.

An overview of baking and proofing systems BPS which utilize conveyors incorporating the invention is shown in FIG. 2. A typical baking and proofing system BPS includes a proofer PF in which the dough product is allowed to rise and an oven OV in which the dough product is baked.

The proofer PF has an endless conveyor PEC which moves the metal dough receptacles through the proofer PF while the oven OV has a similar endless conveyor OEC which moves the metal dough receptacles through the oven. A conventional receptacle loading device RLD is provided for loading the metal dough receptacles onto the proofer endless conveyor PEC for movement of the receptacles through the proofer PF. As will become more apparent, the metal dough receptacles are moved onto the endless conveyor PEC by transfer conveyor TC in the loading device RLD. After the dough products carried in the metal dough receptacles are moved through the proofer PF, the receptacles are offloaded from the conveyor PEC by another transfer conveyor TC in the receptacle transfer device RTD also of conventional construction.

The receptacle transfer device RTD moves the metal dough receptacles onto the inlet side of the oven endless conveyor OEC through another transfer conveyor TC at the discharge end of the transfer device RTD. After the conveyor OEC moves the metal dough receptacles through the oven OV to bake the dough products, a transfer conveyor TC on the conventional receptacle unloading device RUD removes the metal dough receptacle with the baked bakery products from the oven conveyor OEC. It will be appreciated that each of the endless conveyors PEC and OEC have a section which extends outside of its respective proofer or oven so that the metal dough receptacles can be loaded onto each of the conveyors and unloaded from each of the conveyors.

Figure 10:
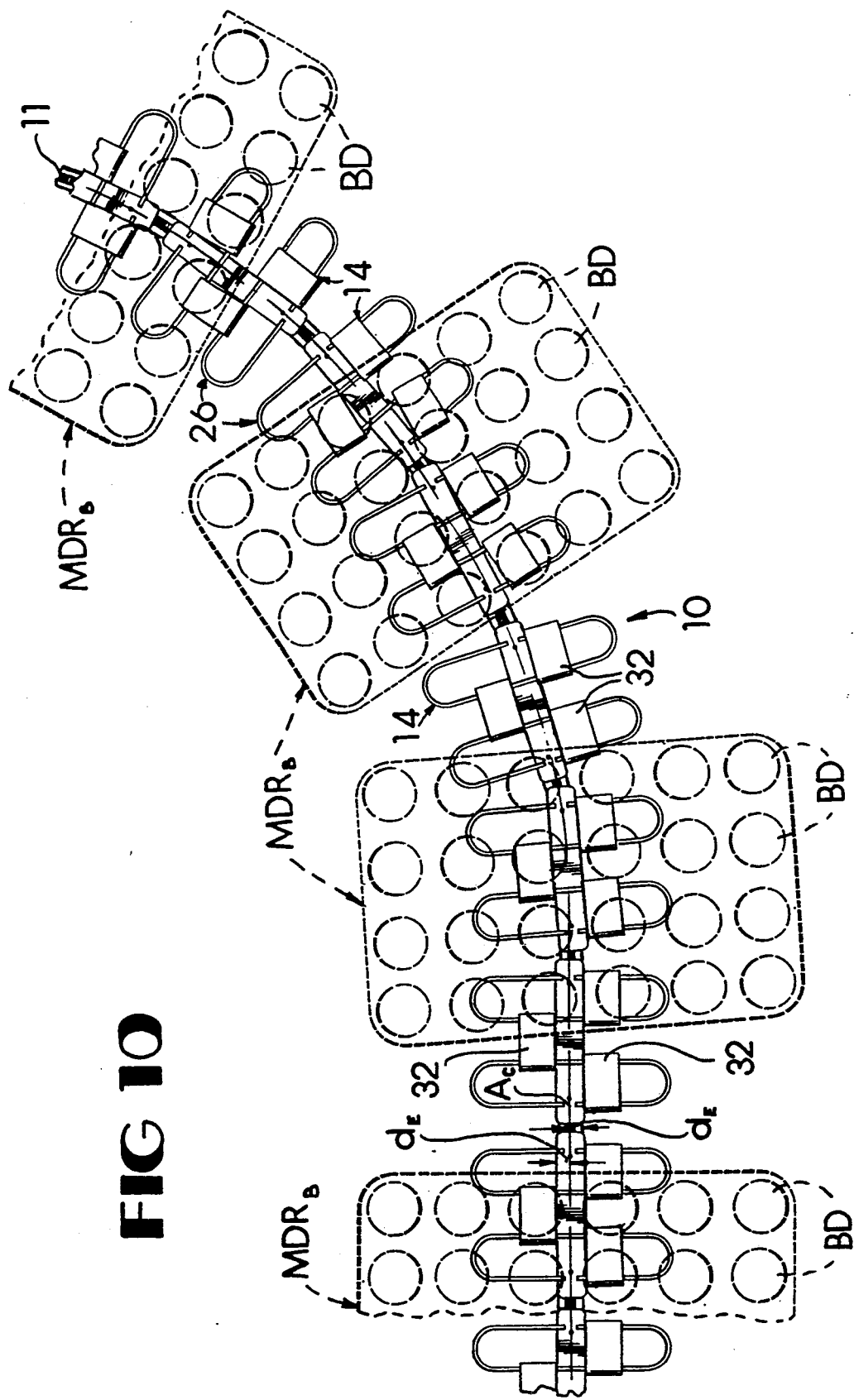
FIG. 10 is a schematic view similar to FIG. 8 showing the conveyor supporting bun type metal receptacles with an even number of rows thereacross.
Figure 12:
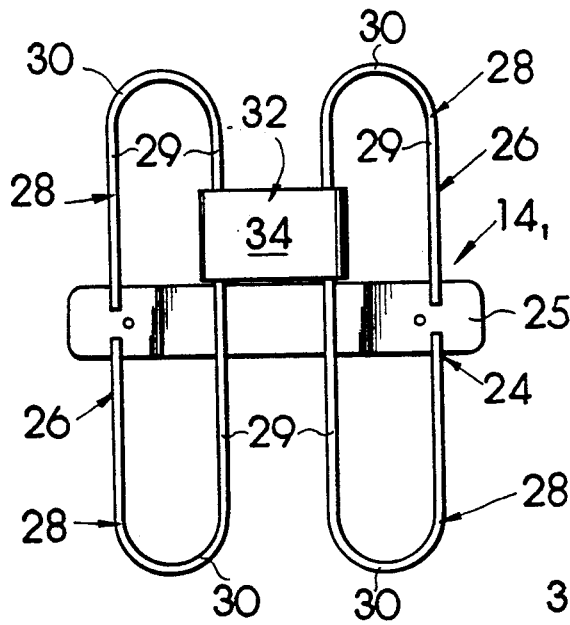
FIGS. 12-17 are schematic top views illustrating different configurations of support grids and magnet units.
Figure 13:
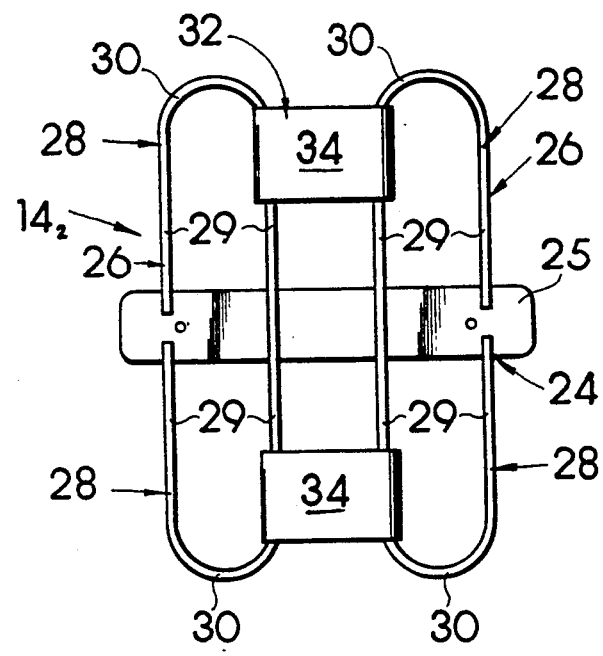
Figure 14:
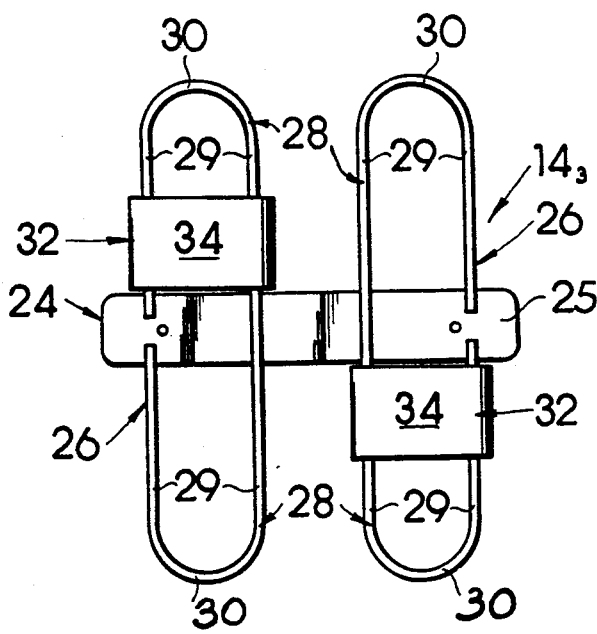
Figure 15:
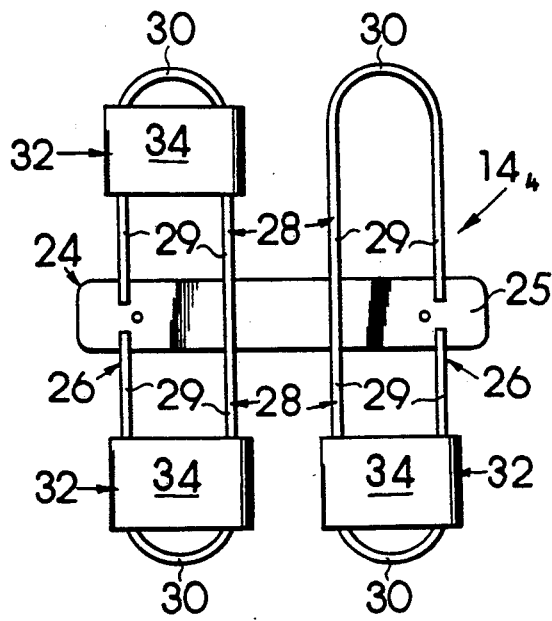

Baking operations typically use different sizes and/or different configurations of metal dough receptacles depending on the production quantity or production sizes of dough products needed. FIGS. 8 and 9 illustrate metal dough receptacles $MDR_L$ used to make bread loaves while FIGS. 10 and 11 illustrate metal dough receptacles $MDR_B$ used to make buns. It will be understood that these particular configurations are for illustration only and that there are many different receptacle configurations which may be used without departing from the scope of the invention.

Figure 1:
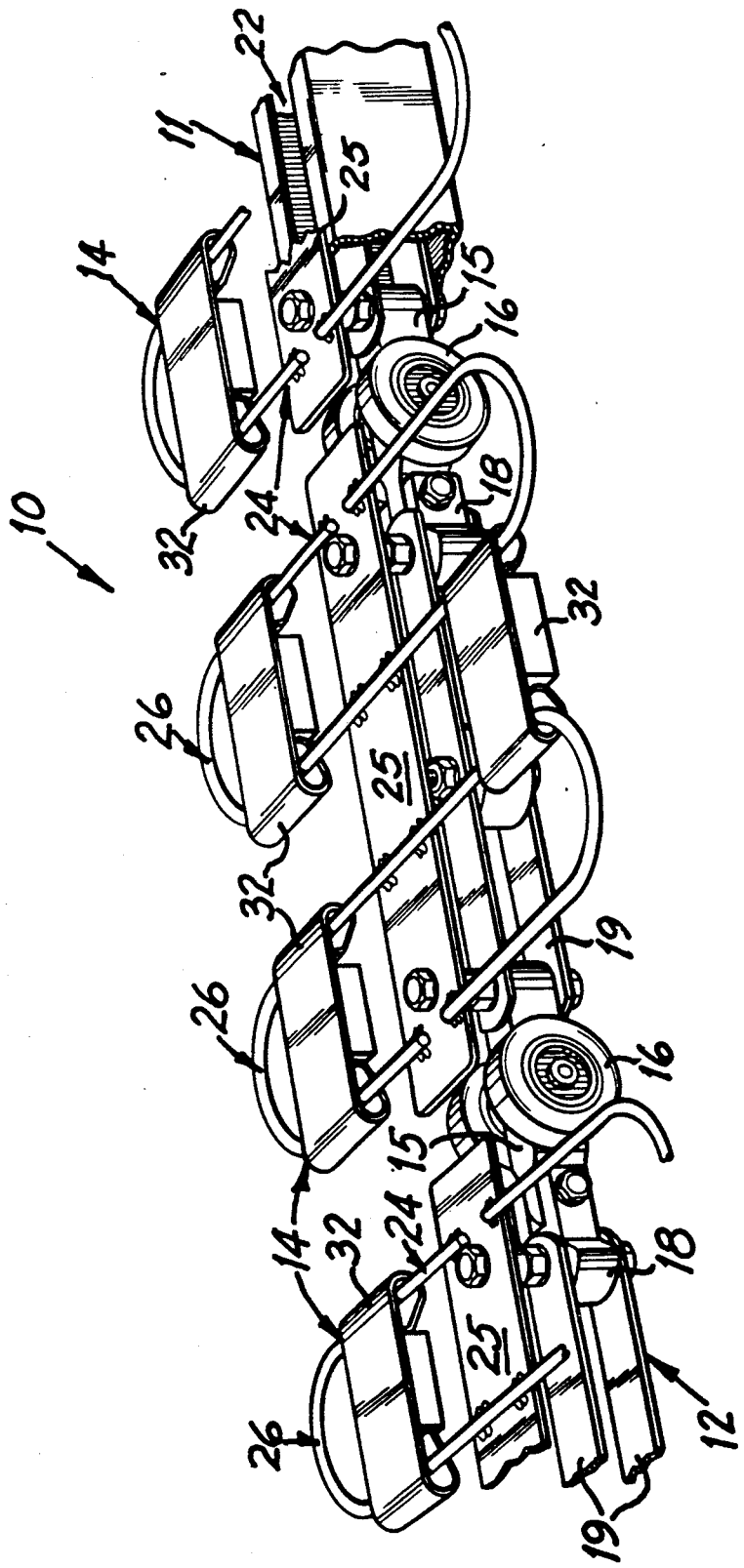
FIG. 1 is a perspective view illustrating a short section of a conveyor incorporating the invention.

The system 10 illustrated can be used in both the proofer and oven endless conveyors PEC and OEC. The system 10 as seen in FIG. 1 includes a support channel 11 through which an endless conveyor chain 12 rides. The chain 12 mounts a plurality of support grid assemblies 14 thereon that overlie the channel 11 and move with the chain 12 along the helical conveyor flights through the baking and proofing equipment.

Figure 4:
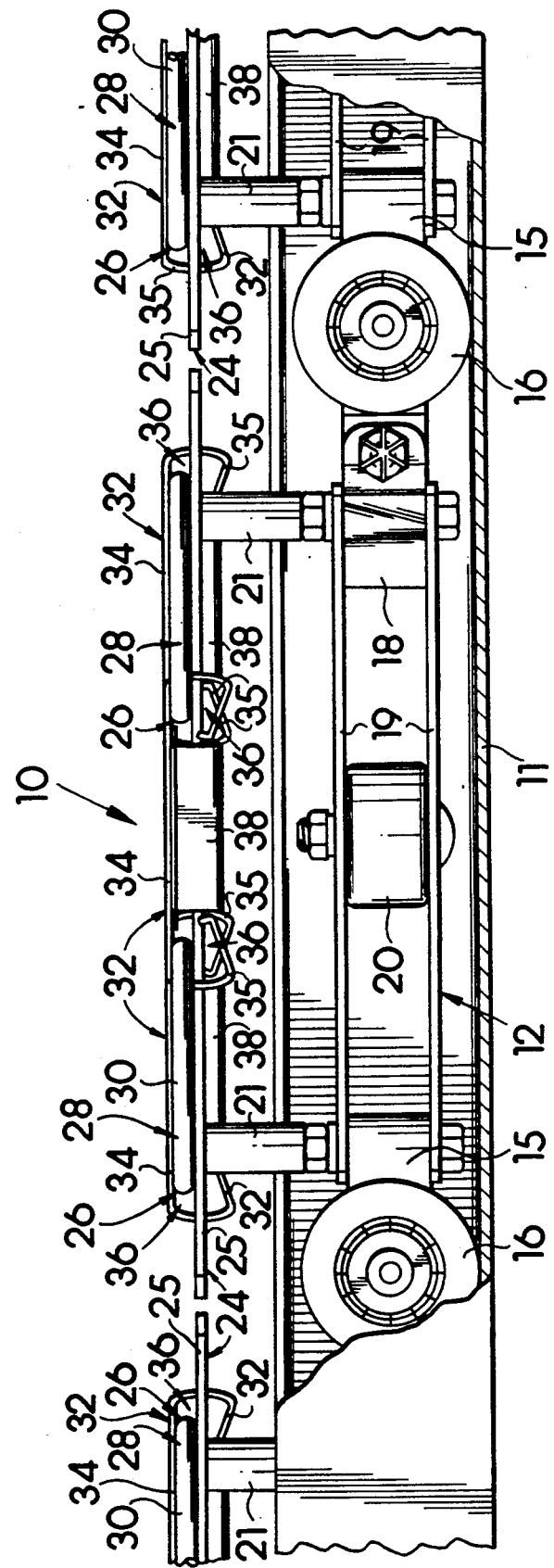
FIG. 4 is a side elevational view of the conveyor with the support track shown in longitudinal cross-section for clarity.

The chain 12 as best seen in FIGS. 1 and 4 has a plurality of wheeled links 15 with support wheels 16 that roll along the bottom of the channel 11 to vertically support the chain 12. One end of each of the wheeled links 15 is pinned to a drive link 18 about a horizontal pivot axis. The other end of each wheeled link 15 is pinned to upper and lower side bars 19 about a common vertical pivot axis. The opposite ends of the side bars 19 are pinned to the drive link 18 connected to the adjacent wheeled link 15 at that end of the drive link 18 opposite its pinned connection to the adjacent wheeled link 15. The bars 19 are also pinned to the drive link 18 about a common vertical axis. Thus, the horizontal pinned connections between each wheeled link and drive link permit the chain to move around vertical turns. The vertical pinned connections at the opposite ends of the side bars permit the chain to move around horizontal turns. To maintain the chain 12 laterally centered in the support channel 11, a guide wheel 20 is rotatably mounted between the centers of the side bars 19 about a vertical axis. A pair of spacers 21 mounted on top of opposite ends of the top side bar 19 at the vertical pivot connections project out of the top of the channel 11 through the opening 22 extending along the length of the channel 11. The spacers 21 have a diameter smaller than the opening 22 so that turns may be made without the spacers striking the sides of the opening 22. Turn radii of about five feet are typically used in this industry. One of the support grid assemblies 14 is mounted between the tops of each pair of spacers 21 so that there is no movement between the support grid assembly 14 and the side bars 19 as will become apparent.

As best seen in FIGS. 1, 3 and 4, the support grid assembly 14 includes an elongate mounting plate 25 which is attached to the spacers 21 by bolts so that the longitudinal axis of plate 25 overlies the longitudinal axis $A_C$ of the conveyor chain 12 and is longitudinally centered over one set of side bars 19 above the channel 11. The width of the plate 25 is wider than the width of the opening 22 in channel 11 to prevent dough and debris from falling into the channel.

A plurality of support rods 26 are mounted on the mounting plate 25 and project laterally outwardly therefrom coplanar therewith. There are two support rods 26 illustrated but one or more may be used without departing from the scope of the invention. Each support rod 26 has a pair U-shaped sections 28 which project out on opposite sides of the plate 25. Each U-shaped section 28 has a pair of spaced apart parallel side legs 29, the projecting ends of which are integrally joined by a curved end portion 30. The rod 26 is oriented normal to the axis of the chain 12 so that the legs 29 are perpendicular to the plate 25 and chain 12 in the horizontal plane as well as in the vertical plane as will become more apparent. The side legs 29 of each section 28 are spaced apart a longitudinal distance $d_1$. While other spacings may be used, the adjacent side legs 29 of the adjacent support rod 26 on the mounting plate 25 are also spaced apart the longitudinal distance $d_1$. The legs 29 project out from the edges of the mounting plate 25 a distance $d_2$ as will be explained.

Figure 5:
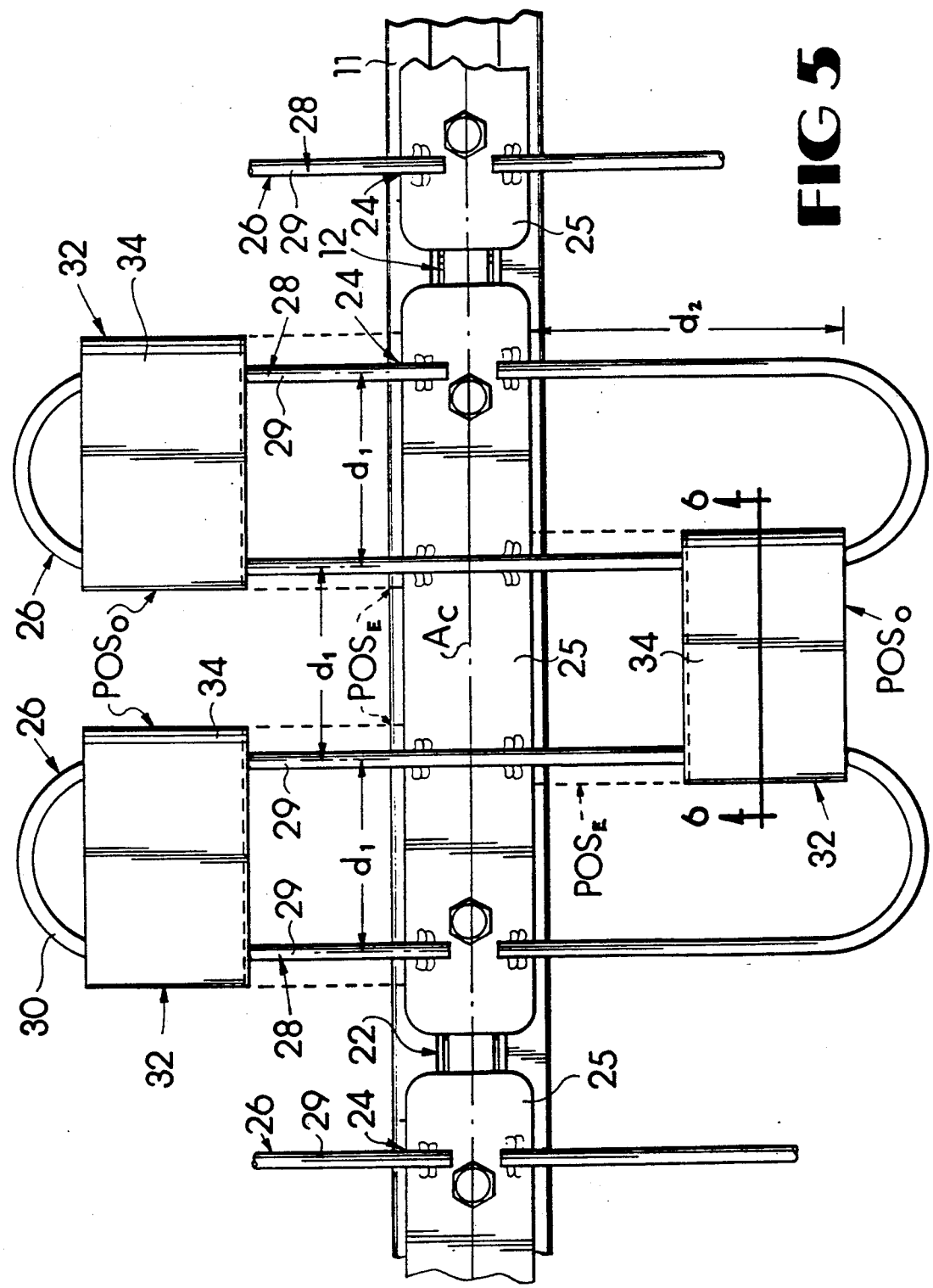
FIG. 5 is a top plan view of the grid assembly.
Figure 6:
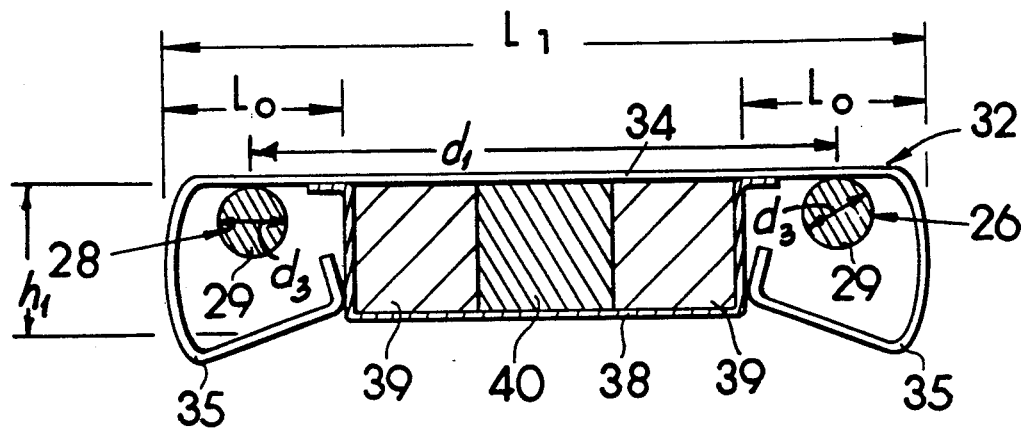
FIG. 6 is an enlarged transverse cross-sectional view of one of the magnet units taken along line 6—6 in FIG. 5.

The support grid assembly 14 also includes one or more magnet units 32 mounted on the support rods 26. Each of the magnet units 32 includes a top plate 34 with a generally rectilinear shape and a length sufficiently greater than the distance $d_1$ so that opposite end portions 35 of top plate 34 can be bent back under the remainder of the plate to form spaced apart openings 36 through which two adjacent side legs 29 on the support rods 26 of the support grid assembly 14 extend as best seen in FIGS. 5 and 6. The end portions 35 have a reinforcing lip 42 which projects into the opening 36 to limit movement of the side legs 29 of the support rods 26 within the opening.

The openings 36 have a length $L_O$ greater than the rod diameter $d_3$ and a height $h_1$ also greater than the diameter $d_3$ as will become apparent. The length $L_1$ of the top plate 34 as seen in FIG. 5 after the end portions 35 are bent into position is greater than the distance $d_1$ so that the center-to-center distance of the openings is about the same as the legs 29 passing through the openings. This permits the magnet unit 32 to turn with the metal dough receptacle MDR as it moves around a turn since the openings 36 are larger in cross-section than the legs 29 as will become more apparent. This difference in cross-section area can vary depending on the positioning of the magnet unit 32 relative to the longitudinal axis of the chain 12 and is illustrated as allowing about 0.3–0.5 inch of fore and aft movement. It will also be noted that the openings 36 permit the plate 25 to move up and down with respect to the rod 26 as will become more apparent. While the difference may be different for different applications, a difference of about 0.25–0.5 inch in the height $h_1$ and the diameter $d_3$ has been found satisfactory. Further, the plate 25 can slide laterally along the legs 29 from a first position $POS_O$ shown in solid lines in FIG. 3 where the outside edges of the plate 25 engage the curved end portions 30 of the rods 26 to a second position $POS_E$ shown by dashed lines in FIG. 3 where the inside edges of the plate 25 engage the side of the mounting plate 25.

Figure 7:
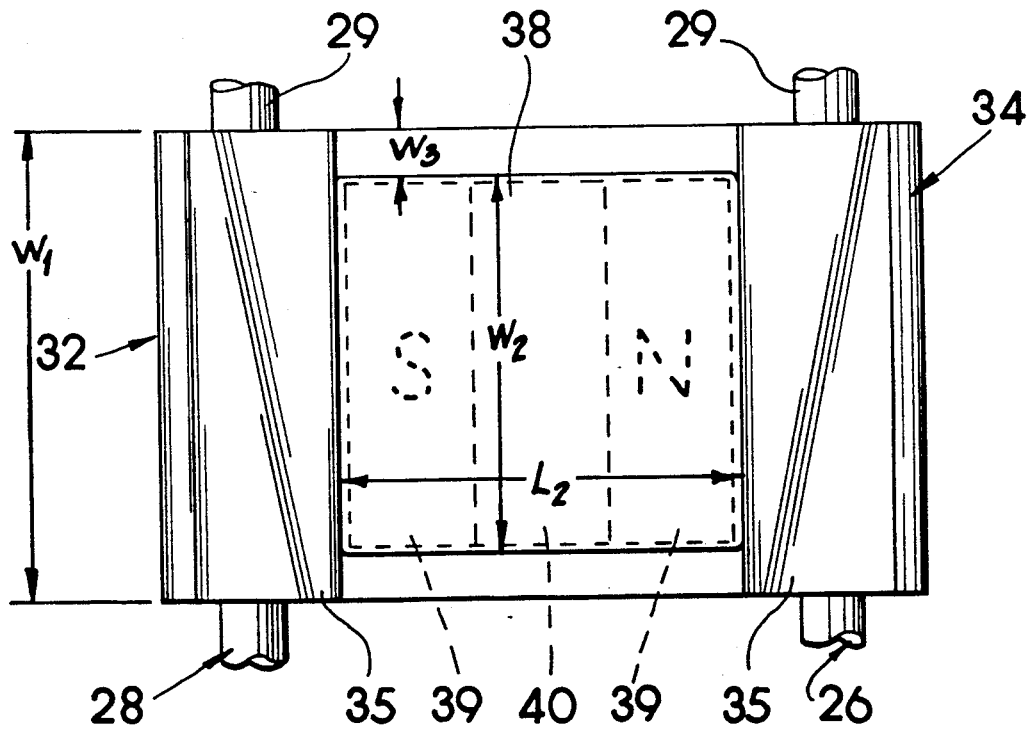
FIG. 7 is an enlarged bottom view of the magnet unit.

As best seen in FIGS. 5 and 6, the magnet unit 32 also includes a housing 38 which is attached to the underside of the top plate 34 between the bent end portions 35. The housing 38 has a width $W_2$ less than the width $W_1$ of the top plate 34 and is centered on underside of the top plate to leave clearance spaces 41 of width $W_3$ along opposite side edges of the plate 34 as best seem in FIG. 7 which facilitate the installation of the magnet unit 32 as will become more apparent.

The housing 38 mounts a pair of bar magnets 39 therein so that the longitudinally axes thereof are oriented parallel to the legs 29 which mount the magnet unit 32. A non-magnetic separator 40 is positioned in the housing 38 between the bar magnets 39. The magnets are magnetized so the upper and lower faces are the two opposed poles. The magnets 39 are also oriented so that the pole faces of the two magnets 39 in the housing 38 facing the top plate 34 are oppositely magnetized as noted in FIG. 6. The grid assemblies 14 are made out of stainless steel and are thus non-magnetic. Likewise, the top plate 34 and housing 38 are also made out of stainless steel and are also non-magnetic. The separator 40 is also non-magnetic and is aluminum in the embodiment shown. The metal dough receptacles MDR, on the other hand, are made out of carbon steel and thus are ferromagnetic so that the metal dough receptacles MDR are magnetically attracted to the magnets 39 when the receptacles MDR are set on top of the top plate 34. The magnetic attraction is enhanced because the receptacles MDR complete a magnetic circuit between the opposite poles on the two bar magnets 39 in the magnet unit 32 with a minimum of air gaps. As a result the magnetic attraction between the receptacles MDR and the support grid assemblies 14 is maximized.

As indicated above, the metal dough receptacles have different bottom configurations that is determined by the dough product being produced. Two of the more common general types of receptacles are illustrated, the receptacle $MDR_L$ for producing loaves of bread and the receptacle $MDR_B$ for producing buns. Of these general types, there are different sizes. For instance, the receptacles $MDR_L$ are made by strapping different numbers of loaf pans LP together with a metal strap SP. The pans are typically 10 or 16 inches long and the overall width is typically 24, 30 or 36 inches corresponding to 4, 5 or 6 pans wide. The receptacles $MDR_B$ are typically one piece with the desired number of depressions to hold the dough products such as buns, rolls or cluster rolls. The receptacles $MDR_B$ typically have lengths of about 10 or 24 inches and vary in width from about 20–38 inches. The receptacle $MDR_L$ illustrated is based on a 10 inch long pan and 5 pans wide at about 30 inches. The receptacle $MDR_B$ illustrated is based on a bun pan 4 rows long and 6 rows wide at about 24 inches long and about 30 inches wide. Thus, the receptacle $MDR_L$ illustrates an odd number of transverse rows while the receptacle $MDR_B$ illustrates an even number of transverse rows. While the following comments are directed to the odd rowed receptacles $MDR_L$ and the even rowed receptacles $MDR_B$, it will be appreciated that any type receptacle may have an odd or an even number of transverse rows.

Since there are an odd number of rows across the width of the receptacle $MDR_L$, the bottom of the center row of dough cavities is located in alignment with the conveyor central axis $A_C$ to locate the inside edges of the next two adjacent rows at equal distances $d_O$ from the central axis as seen in FIGS. 8 and 9. Since there are an even numbers of rows across the width of the receptacle $MDR_B$, the inside edges of the two central rows are located at different equal distances $d_E$ on opposite sides of the conveyor central axis $A_C$ receptacle as best seen FIGS. 10 and 11.

The receptacles MDR are loaded onto the system 10 by the transfer conveyor TC as best illustrated in FIGS. 3 and 3A. It will be seen that the transfer conveyor TC includes a pair of spaced apart flat conveyor chains 45 located on opposite sides of the grid assemblies 14 as they move along the external flight or tier of the system 10 located outside the piece of equipment with which the system 10 is used. The upper flights of the conveyor chains 45 angle downwardly so that they pass from a position above the grid assemblies 14 to a position below the plane of the grid assemblies. The receptacles MDR ride down the chains 45 with the correct spacing therebetween so that the receptacles MDR will be deposited onto the grid assemblies 14 with the required spacing therebetween to provide turning clearance. Where the turn radius is about five feet, the receptacles are spaced apart about one-half the receptacle length. Side guides 46 on the transfer conveyor TC keep the receptacles laterally centered on the axis $A_C$ of the grid assemblies 14.

Since the magnet units 32 need to be in position $POS_O$ on the grid assembly 14 for receptacles MDR with an odd number of rows across the width thereof and need to be in position $POS_E$ for receptacles MDR with an even number of rows across the width thereof, a magnet positioner 48 is provided. Magnet positioners 48 as best seen in FIGS. 3 and 3A are located just above the plane of the grid assemblies 32 upstream of the point at which the transfer conveyor TC deposits the receptacles onto the system 10. Each positioner 48 includes an elongate ferromagnetic member 49 positioned immediately above the plane along which the tops of the magnet units 32 pass so that the magnets 39 will attract the magnet units 32 to the member 49. The member 49 is sufficiently long to extend across both positions $POS_E$ and $POS_O$. A driver 50 is connected to the member 49 so the trailing end thereof points toward the position to which the magnet unit 32 is to be moved. Thus, to move the magnet units 32 out to the position $POS_O$ for the odd number of rows in the receptacle MDR, the trailing ends of the members 49 point outwardly as shown by solid lines in FIG. 3. To move the magnet units inwardly to the position $POS_E$ for the even number of rows in the receptacle MDR, the trailing ends of the members 49 point inwardly as shown by dashed lines in FIG. 3. As the magnet units 32 pass under the members 49, they are attracted to and remain aligned with the members 49 so that they are forced along the legs 29 on rods 26 to the position $POS_O$ or $POS_E$ for which the positioners 48 are set. Thus, in FIG. 3, the members 49 as shown in solid lines move the magnet units 32 out to the odd positions $POS_O$ as the grid assembly 14 moves under the positioners 48. The positioners 48 may be controlled manually or by the system controller such as a computer.

FIGS. 8 and 9 illustrate the system 10 being used to support receptacles $MDR_L$ with an odd number of rows across the width thereof. The magnet units 32 are set to the outermost positions $POS_O$ so that they underlie the two pans LP adjacent the center pan. It will be noted that even though the length of the receptacles $MDR_L$ is different from the grid assembly spacing on the system 10, each receptacle $MDR_L$ is always magnetically attracted by at least two magnet units 32 to insure that the receptacle is maintained in its lateral location on the system 10. Since the openings 36 in the magnet units 32 are larger than the diameter of the legs 29 on the rods 26 of frames 24, the magnet units 32 can shift slightly with respect to the frame 24 as the receptacles $MDR_L$ move around the turns in the system 10 so that the receptacles remain aligned on the system 10. This prevents the receptacles $MDR_L$ from laterally shifting as they move around turns to insure that the receptacles remain on the system 10. The size of the rods 26 is selected to provide all of the support necessary for the receptacles. Since the receptacles remain aligned with the system 10, the side supports associated with prior art systems can be eliminated thereby significantly reducing the cost of the present system.

FIGS. 10 and 11 illustrate the system 10 being used to support receptacles $MDR_B$ with an even number of rows across the width thereof. The magnet units 32 are set to the innermost positions $POS_E$ so that they underlie the two center rows of bun depressions BD. It will be noted that even though the length of the receptacles $MDR_B$ is different from the grid assembly spacing on the system 10, each receptacle $MDR_B$ is always magnetically attracted by at least four magnet units 32 to insure that the receptacle is maintained in its lateral location on the system 10. Because the openings 36 in the magnet units 32 are larger than the diameter of the legs 29, the magnet units 32 can shift slightly with respect to the frame 24 as the receptacles $MDR_B$ move around the turns in the system 10 so that the receptacles remain aligned on the system 10. Thus, the receptacles $MDR_B$ are also prevented from laterally moving sufficiently to fall off system 10.

It will also be seen that the system 10 automatically accommodates different sizes of receptacles since more magnet units 32 are magnetically attracted to the larger receptacles to provide the necessary force to keep them in place on the system 10. Also, because the bar magnets 39 in the magnet units 32 are oriented normal to the axis $A_C$ of the system 10, the receptacle will span both magnets 39 in a unit 32 to provide significant magnetic attraction even though not all of the top of the magnet unit 32 is in contact with the bottom of the receptacle MDR.

The construction of the magnet unit 32 and the frame 24 permits a wide range of receptacle sizes and configurations to be accommodated without any change in the construction of these components. The user simply has to change the number or location of the magnet units 32 on the U-shaped sections 28. In any proofing and baking operation, there are a limited number of receptacle sizes and configuration to be encountered. Therefore, the user selects the number and location of the necessary magnet units 32 to handle the range of receptacles used at that operation and mounts them on or between the U-shaped sections 28 as seen in FIGS. 20–22. Typically, the magnet units 32 are shipped to the location with the end portions 35 of the top plates 34 unbent or in the position seen in FIG. 20 so that the unit 32 can be laid onto the top of the legs 29 of the frame 24. Each end portion 35 of the top plate 34 is then bent under one of the legs 29 through the position seen in FIG. 21 and finally to the position seen in FIG. 22. This mounts the magnet unit 32 onto the legs 29 so the magnet unit will not fall off the frame 24 yet can move as described above.

Figure 16:
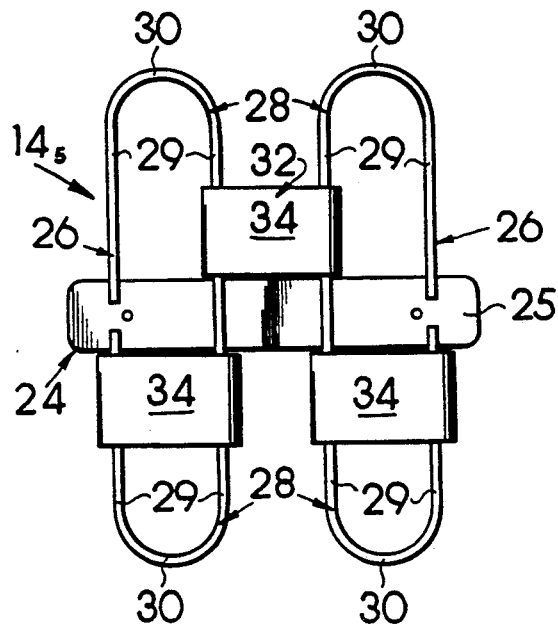
Figure 17:
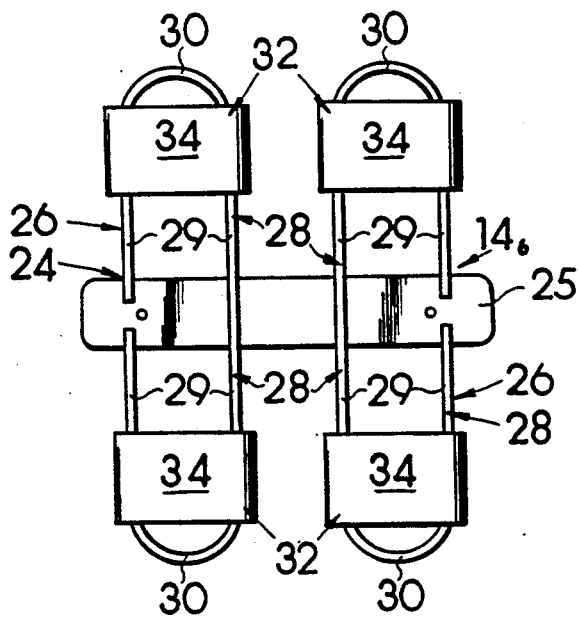

FIGS. 12–17 illustrate some of the many arrangements of magnet units 32 on the frame 24. The grid assembly $14_1$ seen in FIG. 12 has one magnet unit 32 mounted on the legs 29 between the two support rods 26. The grid assembly $14_2$ seen in FIG. 13 has two magnet units 32 mounted on the legs 29 between the two support rods 26, one on either of the mounting plate 25. The grid assembly $14_3$ seen in FIG. 14 also has two magnet units 32 mounted on the legs 29 of the two support rods 26, but with the magnet units 32 on one of the U-shaped sections 28 of each of the support rods 26 and with the magnet units located diagonally across the mounting plate 25. The grid assembly $14_4$ seen in FIG. 15 has three magnet units 32 mounted on the legs 29 of the two support rods 26. The grid assembly $14_4$ has one magnet unit 32 on each of the U-shaped sections 28 of one of the support rods 26 and has one magnet unit 32 on only one of the U-shaped sections 28 of the other support rod 26. The grid assembly $14_5$ seen in FIG. 16 is the unit illustrated in FIGS. 1–11 and has three magnet units 32 mounted on the legs 29 of the two support rods 26. The grid assembly $14_5$ has one magnet unit 32 on one of the U-shaped sections 28 of each of the support rods 26 on one side of the mounting plate 25 and has one magnet unit 32 mounted between the inside legs 29 of the U-shaped sections 28 of both support rods 26 on the opposite side of the mounting plate 25. The grid assembly $14_6$ seen in FIG. 17 has four magnet units 32 with one mounted on each U-shaped section of the support rods 26.

It will further be appreciated that the magnet unit 32 may be mounted on the frames of other grid assemblies. All that a user has to do is locate two spaced apart rods on the frame of such grid assembly and bend the end portions 35 of the top plate 34 on the magnet unit 32 around the rods. It will be appreciated that the magnet unit 32 will still be able to move with respect to the support rods for the magnet units 32 to adjust as the grid assemblies move around turns.

Figure 18:
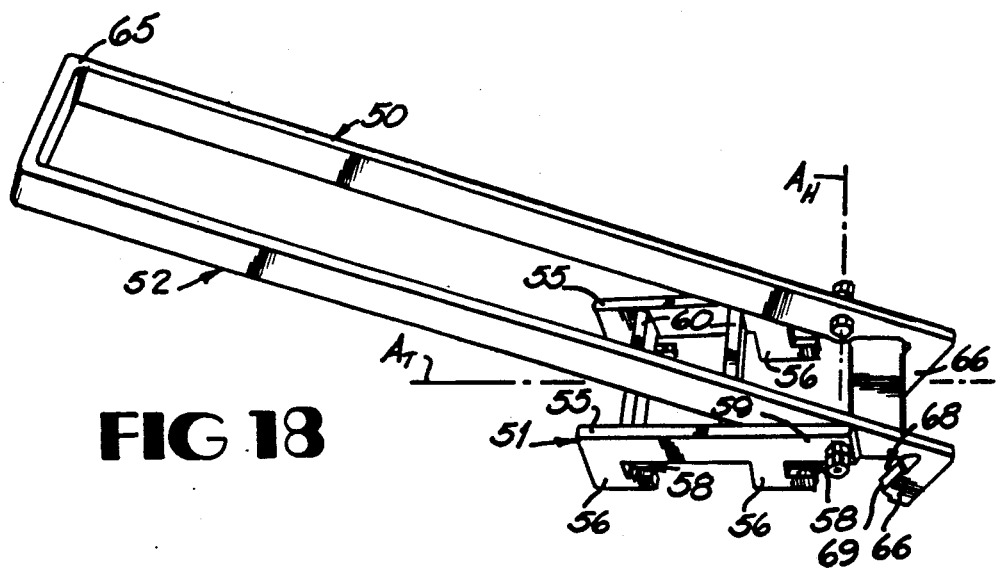
FIG. 18 is a perspective view of the installation tool used to install the magnet units of the invention.
Figure 19:
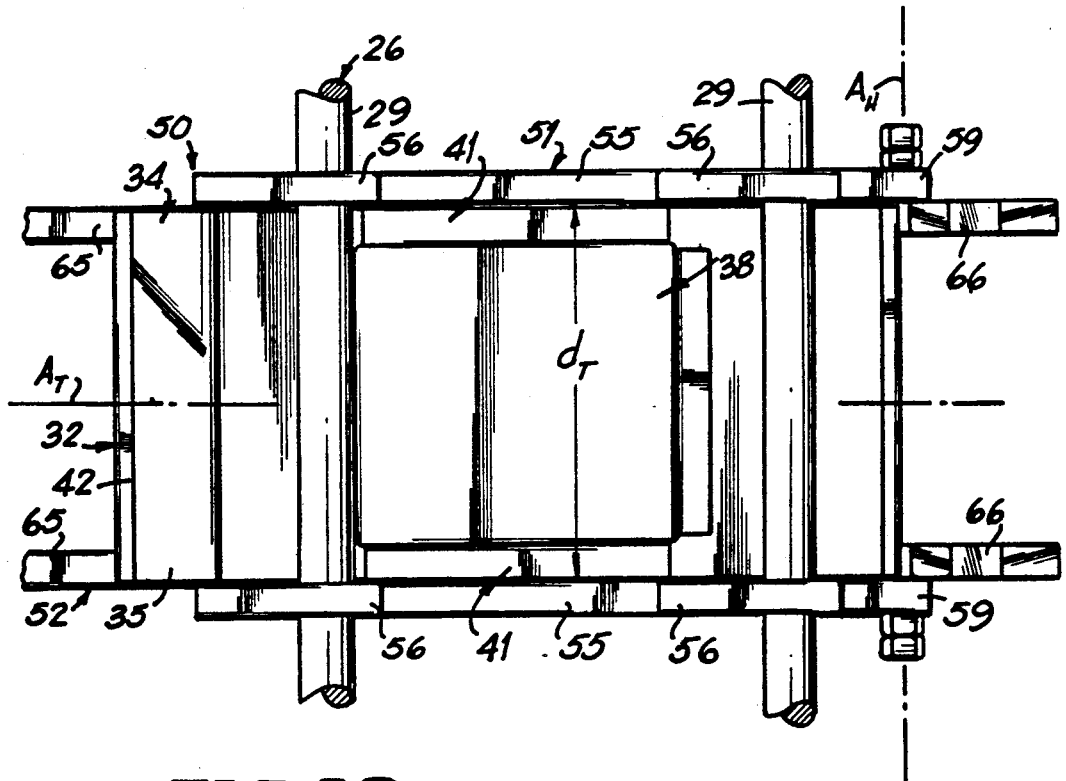
FIG. 19 is an enlarged bottom view thereof showing how the magnet unit fits into the tool during installation.

An installation tool 50 is illustrated in FIGS. 18 and 19 for use in installing the magnet units 32 on the rods 26. The installation tool includes a positioning assembly 51 which locates the magnet unit 32 relative to the support rod 26 while the magnet unit 32 is being installed and a handle assembly 52 which is used to bend the end portions 35 around the legs 29 on the rod 26.

The positioning frame 52 includes a pair of spaced apart parallel side plates 55. Each side plate 55 has a pair of L-shaped locating hooks 56 mounted on the bottom edge thereof. Each L-shaped hook 56 defines a cutout 58 with the bottom of the side plate 55 that opens toward the pivot end 59 of the frame assembly 51 as will become more apparent. Each cutout 58 is sized to receive one of the legs 29 of rod 26 therein to mount the frame assembly 51 on the rod 26. The cutouts 58 on each side plate 55 have the same center to center spacing as the legs 29 on rod 26 so that both legs 29 will fit into the cutouts 58 on each side plate 55 to locate the side plate 55 with respect to the rod 26. Cross members 60 fixedly join the side plates 55 so that the cutouts 58 on each side plate 55 are aligned with the cutouts 58 on the other side plate 55 to locate the frame assembly 51 on the legs 29 with the longitudinal axis $A_T$ of the frame assembly 51 perpendicular to the legs 29 as best seen in FIG. 19. The side plates 55 are spaced apart a distance $d_T$ which is slightly greater than the width $W_1$ of the top plate 34 on the magnet unit 32 so that the top plate 34 will fit in between the side plates 55 as best seen in FIG. 19. The cross members 60 are located so that the bottom edges 61 thereof will be magnetically attracted to the magnet unit 32 to keep it in place in the frame assembly 51 and properly locate the magnet unit 32 with respect to the legs 29 on rod 26 for installation as best seen in FIGS. 20-22.

The handle assembly 52 is pivoted to the pivot end 59 of the frame assembly 51 about pivot axis $A_H$. The handle assembly 52 includes a handle 65 which mounts a pair bending dogs 66 on that end of the handle projecting toward the hooks 56 so that the bending dogs 66 are spaced apart a distance greater than the width $W_2$ of the housing 38 and less than the width $W_1$ of the top plate 34. Since the end portions 35 of the top plate 34 are of the same width as the top plate, the dogs 66 will engage the end portions 35 as seen FIGS. 19-22 to bend them.

The end of the handle 65 opposite the dogs 66 project out from the pivot end of the frame assembly 51 to be manually engaged and operate the tool 50. Clearance cutouts 68 are provided in the handle 65 adjacent the dogs 66 to permit the dogs to fully bend the end portions 35 as best seen FIG. 22. The spacing of the dogs 66 with respect to the axis $A_H$ and the size thereof is such that the dogs 66 will initially engage the end portions 35 at the lip 42 as best seen in FIG. 20. As the dogs 66 continue to bend the end portions 35 around the leg 29, the end portion 35 shifts with respect to the dogs 66 until the driving surfaces 69 fully engage the surface on the end portion 35 as best seen in FIG. 22. This allows the end portion 35 to be finally seated as seen in FIG. 22.

Thus, it will be seen that the installer first places the magnet unit 32 with the initially bent end portions 35 as seen in FIG. 20 into the frame assembly 51. The tool 50 is then placed on the legs 29 of the support rod 26 as seen in FIG. 20. As the handle 65 on the tool 50 is raised above the rod 26, the dogs 66 bend the end portion 35 around the legs 29 but in clearance therewith through the position seen in FIG. 21 to the final installed position seen in FIG. 22. After one side of the magnet unit 32 is installed as seen in FIG. 22, the tool 50 is reversed and the process repeated to install the other side.

What is claimed as invention is:

1. A magnet unit adapted to be mounted on the support grid of a conveyor to support ferromagnetic dough receptacles thereon where such support grid includes at least one pair of spaced apart sections of non-magnetic support rod generally parallel to each other, said magnet unit including:
   a non-magnetic housing sized to fit between the spaced apart sections of support rod;
   a permanent magnet mounted in said housing; and,
   a pair of non-magnetic, spaced apart clip means carried by said housing and adapted to encircle the sections of support rod to mount said magnet unit on said sections of support rod so that the ferromagnetic dough receptacles will be magnetically attracted to said magnet unit and thus to the support grid.

2. The magnet unit of claim 1 wherein said clip means includes a plate member projecting from opposite sides of said housing and adapted to be bent around the spaced apart support rod sections to mount said magnet unit on said support rod sections so that said magnet unit can slide along said support rod sections.

3. The magnet unit of claim 1 wherein said permanent magnet includes at least two spaced apart permanent magnet portions having pole faces of opposite magnetic polarity facing the bottoms of the receptacles so that the ferromagnetic receptacles complete the magnetic circuit between the opposite poles to enhance the magnetic attraction between the receptacle and said permanent magnet.

4. The magnet unit of claim 3 wherein said permanent magnet pole faces defined on said permanent magnet portions are elongate and are oriented normal to the path along which the receptacles are to be conveyed.

5. The magnet unit of claim 3 further including a non-magnetic separator separating said pole faces of opposite polarity.

6. A conveyor system for use in a continuous proofing and baking apparatus to convey ferromagnetic dough receptacles, said conveyor system comprising:
   an elongate track;
   a conveyor chain mounted for movement through the track;
   a plurality of product supporting grid assemblies sequentially carried along the track by the conveyor chain, each of said grid assemblies including:
   a support frame mounted on said conveyor chain for movement therewith along a prescribed conveying path and defining a generally horizontally support plane thereon, said support frame including a central support member mounted on said conveyor for movement therewith and two first pairs of spaced apart legs mounted on said central member and extending outwardly therefrom on one side of the conveying path and two second pairs of spaced apart legs mounted on said central member and extending outwardly therefrom on the other side of the conveying path, all of said pairs of legs oriented generally perpendicular to said conveying path, and a plurality of curved end sections, one of said curved end sections integrally joining each of said pairs of legs, said support frame including first stop means and second stop means thereon;

at least one magnet unit defining a support surface thereon and adapted to magnetically attract said receptacle thereto when said support surface on said magnet unit is in juxtaposition with the bottom surface of one of the ferromagnetic dough receptacles, said magnet unit selectively mounted on any pair of said support legs for selective movement along the horizontal support plane and perpendicular to said conveying path between a first position for said support surface thereon to support the receptacles with the first bottom surface configuration when the movement of said magnet unit is arrested by said first stop means; and a second position for said support surface thereon to support the receptacles with the second bottom surface configuration when the movement of said magnet unit is arrested by said second stop means without removal of said magnet unit from said support legs; and, also for movement over a limited distance in a direction parallel to the path along which the receptacles are moved and for a limited distance in a generally vertical direction to allow said magnet unit to shift with respect to said support frame as the receptacles move around turns and prevent the receptacles from falling off the conveyor, wherein said first stop means is said central support member and wherein said second stop means is said curved end section integrally joining said pair of legs mounting said magnet unit.

* * * * *